United States Patent Office 2,747,422
Patented May 29, 1956

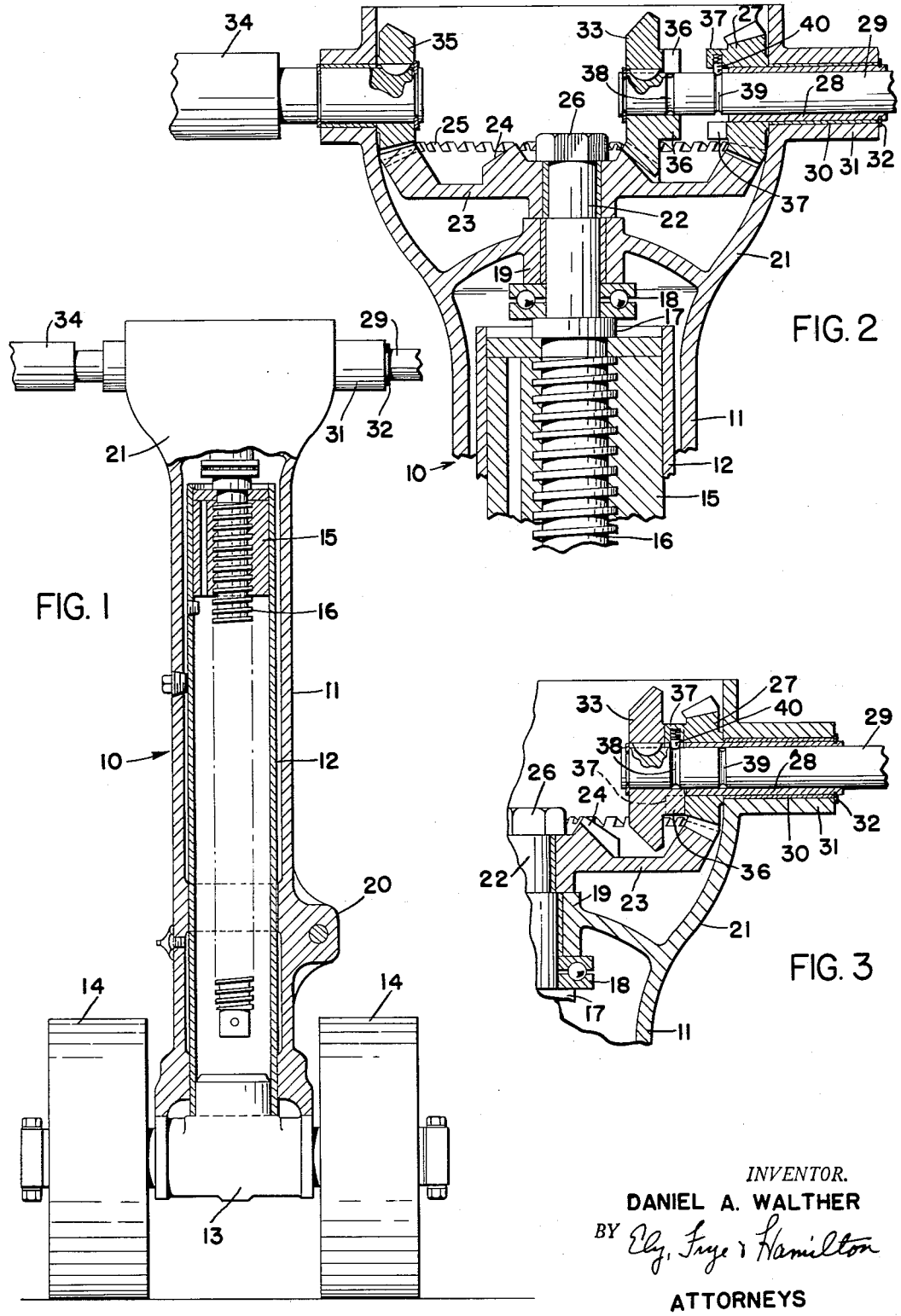

2,747,422

TWO-SPEED LANDING GEAR FOR TRAILERS

Daniel A. Walther, Dayton, Ohio, assignor to The Dayton Steel Foundry Company, Dayton, Ohio, a corporation of Ohio Application October 30, 1952, Serial No. 317,639

4 Claims. (Cl. 74—333)

The invention relates generally to a dolly for supporting the front end of a semi-trailer when it is disconnected from the fifth wheel of a tractor, and more particularly to improved means for raising and lowering the dolly at different speeds, depending upon different conditions.

A conventional two-speed landing gear includes a cross shaft carrying bevel gears meshing with bevel gears on the jack screws which raise and lower the supporting legs of the dolly, and a separate offset shaft carrying ratio changing gears of different size for selectively meshing with mating gears on the first shaft.

Such conventional construction has certain disadvantages in that it requires an additional shaft and an additional set of gears to change the gear ratio to change the speed of the jack screw, resulting in increased cost of manufacture. Also, the additional gearing and the housing therefor requires additional space on the dolly at places where additional space is not always readily available. Moreover, there is a reduction in efficiency due to friction loss in transmitting power through the additional set of gears.

It is an object of the present invention to provide an improved gearing arrangement for a two-speed landing gear which will overcome the foregoing disadvantages and provide an extremely simple and compact construction which is very economical to manufacture.

Another object is to provide a novel two-speed gear construction which does not require a second offset or idler shaft for the ratio changing gears and provides direct connection from the power drive shaft to the jack screws.

These and other objects are accomplished by the parts, improvements, combinations and arrangements comprising the present invention, a preferred embodiment of which is shown by way of example in the accompanying drawing, and described in detail in the specification hereof. Various changes in details may be made without departing from the scope of the invention as defined in the appended claims.

In the drawing,

Figure 1 is an elevational view, partly in section, of one leg structure forming part of a supporting dolly for a semi-trailer, and embodying the two-speed gear mechanism of the present invention;

Fig. 2 is an enlarged fragmentary sectional view of the gear connections at the upper end of the supporting leg structure of Fig. 1, the gears being in high speed position; and Fig. 3 is a view similar to Fig. 2, showing the gears in low speed position.

Similar numerals refer to similar parts throughout the drawing.

The supporting leg structure indicated generally at 10 constitutes one of a pair of identical legs comprising the dolly, so that only one leg is shown and described. The leg structure 10 includes a vertical outer tube 11 telescoped over an inner tube 12 which rests on the axle shaft 13 journaling a pair of supporting rollers 14, one on each side of the tube. The upper end of the inner tube 12 carries a nut member 15 in which the jack screw 16 is threadedly engaged, and the screw shaft has a collar 17 above the upper end of the tube 12 abutting a thrust bearing 18 which in turn abuts the sleeve 19 forming part of the upper housing. The lower portion of the outer tube 11 may be provided with one or more projecting ears 20 to which struts may be attached for supporting the trailer frame.

The parts thus far described are more or less conventional and per se form no part of the present invention.

The upper portion of the outer tube 11 is outwardly flared as shown at 21 to form a gear housing. The upper end 22 of the screw shaft 16 projects above the housing sleeve 19 and has fixed thereon a bevel gear 23 for rotating the screw. This bevel gear may be an integral gear having two concentric gear faces, as shown, or it may be made as two separate gears fixed with respect to each other. The inner gear face is indicated at 24 and the outer one at 25, and the gear may be secured on the shaft portion 22 by a nut 26.

The outer gear face 25 is intermeshed with a bevel pinion 27 which is secured to a bushing 28 journaled on a drive shaft 29, the bushing being mounted in a bronze bushing 30 held in place in a housing sleeve 31 by a snap ring 32. The axis of drive shaft 29 intersects the axis of screw shaft 16 at right angles thereto. The outer end of the drive shaft 29 has attached thereto a crank handle of usual constrution (not shown) for operating the shaft. The pinion 27 may be termed an idler pinion because it is journaled on the drive shaft 29.

The inner end of shaft 29 has a bevel pinion 33 keyed thereon and the pinion is adapted to mesh with the inner gear face 24, as shown in Fig. 2, for driving the screw 16 at high speed as the pinion 27 idles on the shaft. The bevel angles of the gear faces 24 and 25 are necessarily such that the conical elements of their pitch circles pass through the intersection of the axes of shafts 22 and 29. The rotation of gear 23 is transmitted to a cross shaft 34 by a bevel pinion 35, and the other end of the cross shaft is operatively connected by similar bevel gears (not shown) to the screw shaft of the other leg of the dolly so that it is raised or lowered simultaneously.

When it is desired to drive the screw at low speed the operator pulls outwardly on the drive shaft 29 to move the pinion 33 radially outward out of mesh with gear face 24. The outer face of the pinion 33 has circumferentially spaced clutch elements 36 thereon, and the inner face of pinion 27 has complementary clutch elements 37 thereon, so that when the shaft 29 is pulled outwardly the clutch elements 36 and 37 become interengaged or interlocked, as shown in Fig. 3, and the pinion 33 drives the pinion 27 which, being in mesh with the outer gear face of gear 23, drives the screw at low speed. Obviously, this speed is transmitted to the screw on the other leg of the dolly by means of the cross shaft 34 and the bevel gears thereon, in the manner previously set forth.

The shaft 29 is preferably provided with spaced grooves 38 and 39 which are adapted to selectively receive a spring-pressed retainer plug 40 mounted in one of the clutch elements and having a spherical inner end. When the shaft 29 is pushed inwardly to mesh pinion 33 with the gear face 24, the plug 40 yieldingly engages groove 39 to hold the shaft in that position, as shown in Fig. 2. When the shaft is pulled outwardly to the low speed position of Fig. 3, the plug yieldingly engages groove 38 to hold the shaft 29 in that position.

Accordingly, the present improved construction provides a simple, compact and inexpensive two-speed construction which eliminates the need for an additional offset drive shaft with ratio changing gears, and the direct driving connections insure greater efficiency.

Various changes in details may be made within the scope of the invention including changes in the type of gears or gear teeth.

What is claimed is:

1. In a landing gear for semi-trailers having a vertical jack screw enclosed in telescoping tubes, the outer tube being outwardly flared at its upper portion to form a gear housing, concentric gear faces mounted on the jack screw within said housing, a drive shaft at right angles to said jack screw and slidably mounted in said housing, an idler pinion journaled on said drive shaft and meshing with the outer gear face, and a pinion fixed on said drive shaft for meshing with the inner gear face, the pinions having complementary clutch elements on their adjacent faces whereby the fixed pinion may selectively drive the idler pinion.

2. In a landing gear for semi-trailers having a vertical jack screw enclosed in telescoping tubes, the outer tube being outwardly flared at its upper portion to form a gear housing, concentric gear faces mounted on the jack screw within said housing, a drive shaft at right angles to said jack screw and slidably mounted in said housing, an idler pinion journaled on said drive shaft and meshing with the outer gear face, a pinion fixed on said drive shaft for meshing with the inner gear face, the pinions having complementary clutch elements on their adjacent faces whereby the fixed pinion may selectively drive the idler pinion, a cross shaft coaxial with said drive shaft, and a pinion fixed on said cross shaft meshing with said outer gear face for transmitting motion therefrom.

3. In a landing gear for semi-trailers having a vertical jack screw enclosed in telescoping tubes, the outer tube being outwardly flared at its upper portion to form a gear housing, gear means comprising concentric bevel gear faces mounted on the jack screw within said housing, a drive shaft at right angles to said jack screw and slidably mounted in said housing, an idler bevel pinion journaled on said drive shaft and meshing with the outer gear face, and a bevel pinion fixed on the drive shaft for meshing with the inner gear face, the pinions having complementary clutch elements on their adjacent faces whereby the fixed pinion may selectively drive the idler pinion.

4. In a landing gear for semi-trailers having a vertical jack screw enclosed in telescoping tubes, the outer tube having a gear housing at its upper end, a gear mounted on the jack screw within the housing and having integral concentric bevel gear faces, a drive shaft axially movably mounted in said housing and extending at right angles to said jack screw, an idler bevel pinion journaled on said drive shaft and meshing with said outer gear face, a bevel pinion fixed on said drive shaft for meshing with said inner gear face when the drive shaft is moved inwardly of the housing, said pinions having complementary clutch elements on their adjacent faces for interengagement when the drive shaft is moved outwardly, and means yieldably holding said drive shaft selectively in its inner and outer position.

References Cited in the file of this patent

UNITED STATES PATENTS

| | | |
|---|---|---|
| 204,148 | Harris | May 28, 1878 |
| 483,281 | Christopher | Sept. 27, 1892 |
| 1,438,444 | Louat | Dec. 12, 1922 |
| 2,560,769 | Knudsen | July 17, 1951 |